(12) United States Patent
Yoshida et al.

(10) Patent No.: US 9,703,292 B2
(45) Date of Patent: Jul. 11, 2017

(54) AUTOMATIC TRAVELING VEHICLE SYSTEM, CONTROL METHOD AND PROGRAM

(71) Applicant: KABUSHIKI KAISHA TOSHIBA, Minato-ku (JP)

(72) Inventors: Takufumi Yoshida, Funabashi (JP); Keiichiro Urayama, Yokohama (JP); Takashi Tanaka, Asaka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 48 days.

(21) Appl. No.: 14/656,860

(22) Filed: Mar. 13, 2015

(65) Prior Publication Data

US 2015/0260535 A1    Sep. 17, 2015

(30) Foreign Application Priority Data

Mar. 13, 2014   (JP) ................................ 2014-050170

(51) Int. Cl.
| | |
|---|---|
| *G01C 22/00* | (2006.01) |
| *G05D 1/00* | (2006.01) |
| *G05D 1/02* | (2006.01) |
| *B60W 10/00* | (2006.01) |
| *G01C 21/20* | (2006.01) |

(52) U.S. Cl.
CPC ........... *G05D 1/0297* (2013.01); *B60W 10/00* (2013.01); *G01C 21/206* (2013.01); *G05D 2201/0216* (2013.01)

(58) Field of Classification Search
CPC ... B60W 10/00; G01C 21/206; G05D 1/0297; G05D 2201/0216

USPC ............................................................. 701/25
See application file for complete search history.

(56) References Cited

U.S. PATENT DOCUMENTS

| | | | | | |
|---|---|---|---|---|---|
| 4,379,497 | A | * | 4/1983 | Hainsworth | ......... G05D 1/0244 180/168 |
| 5,278,554 | A | * | 1/1994 | Marton | .................. G08G 1/081 340/909 |
| 6,049,745 | A | * | 4/2000 | Douglas | ............... G05D 1/0261 180/168 |
| 2002/0143461 | A1 | * | 10/2002 | Burns | .................... G08G 1/207 701/117 |

(Continued)

FOREIGN PATENT DOCUMENTS

| | | |
|---|---|---|
| JP | 11-161331 A | 6/1999 |
| JP | 2000-181542 A | 6/2000 |

(Continued)

*Primary Examiner* — Harry Oh
(74) *Attorney, Agent, or Firm* — Oblon, McClelland, Maier & Neustadt, L.L.P.

(57) ABSTRACT

According to one embodiment, a limited section controller includes a traffic information update unit, a determination unit, a standby position setting unit, and a traveling restart setting unit. The traffic information update unit updates delay information of the traveling vehicle near the junction. The determination unit determines whether to permit the traveling vehicle to pass based on whether there is the traveling vehicle in the limited section. The standby position setting unit sets a standby position of each of the traveling vehicles of a limited number or less present in a standby section. The traveling restart setting unit determines an approach direction into the limited section.

6 Claims, 19 Drawing Sheets

(56) References Cited

U.S. PATENT DOCUMENTS

| | | | | |
|---|---|---|---|---|
| 2003/0233177 | A1* | 12/2003 | Johnson | G05D 1/0236 701/23 |
| 2004/0122570 | A1* | 6/2004 | Sonoyama | G05D 1/0297 701/23 |
| 2011/0178657 | A1* | 7/2011 | Harasaki | G05D 1/0272 701/2 |
| 2014/0277691 | A1* | 9/2014 | Jacobus | G06Q 10/087 700/216 |
| 2015/0221222 | A1* | 8/2015 | Hamada | G05D 1/0297 701/2 |
| 2015/0310738 | A1* | 10/2015 | Karacan | G08G 1/0112 701/117 |
| 2016/0004252 | A1* | 1/2016 | Nagasawa | G05B 19/41895 701/26 |

FOREIGN PATENT DOCUMENTS

| | | |
|---|---|---|
| JP | 2006-113687 A | 4/2006 |
| JP | 2006-293588 A | 10/2006 |
| JP | 2009-215032 A | 9/2009 |
| JP | 2010-79407 A | 4/2010 |

\* cited by examiner

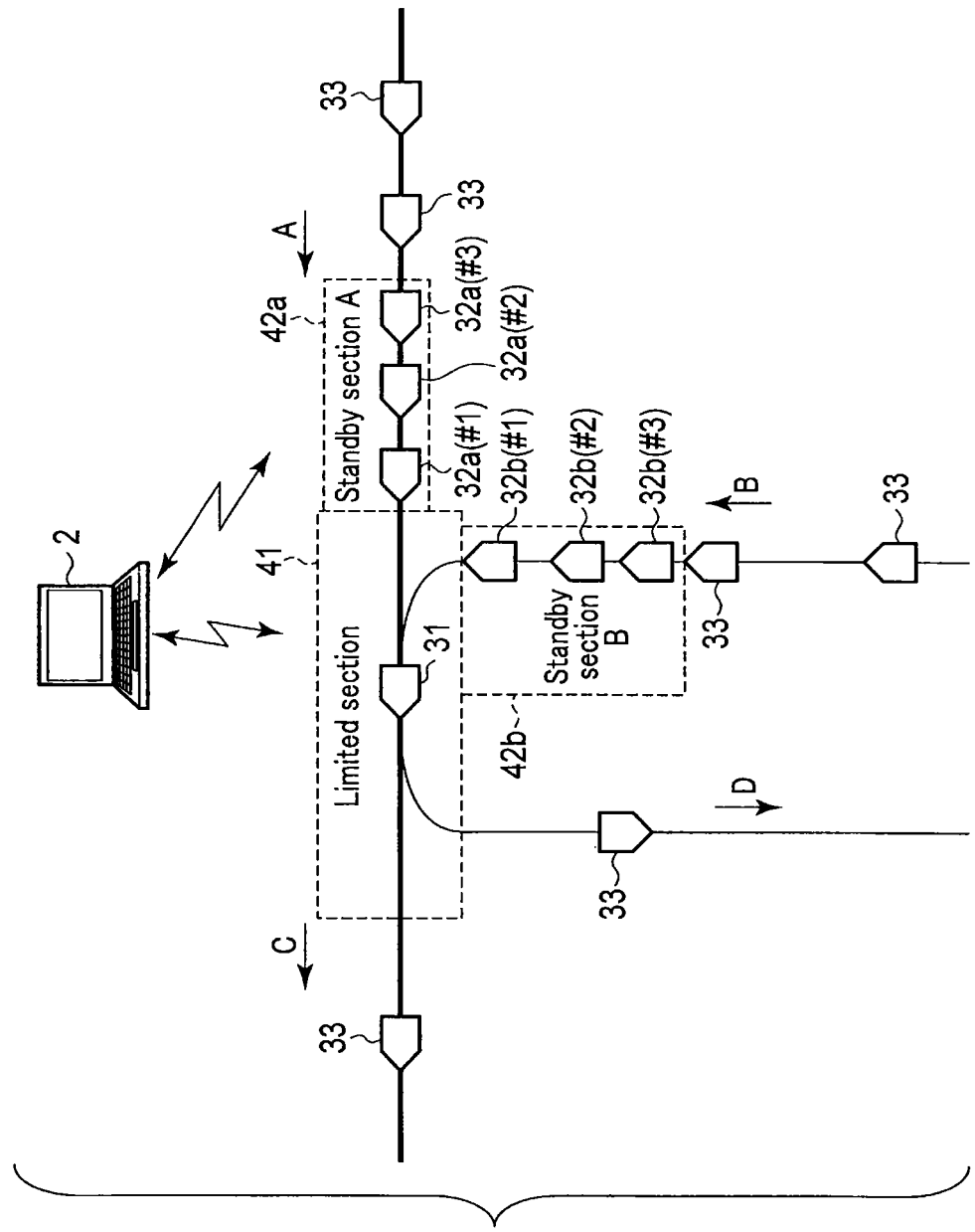
F I G. 4

| Traveling vehicle ID | State | Approach direction | Leaving direction | Traveling job ID | Destination ID | Route ID | Current position (mm) |
|---|---|---|---|---|---|---|---|
| #1234 | Limited traveling state | A | C | C4321234 | #012 | R032-012-0001 | 1052 |
| #0078 | Standby state | A | D | C9876789 | #205 | R111-205-0001 | -791 |
| ... | ... | ... | ... | ... | ... | ... | ... |

| Section | State | Number of vehicles |
|---|---|---|
| Limited section | Limited traveling state | 1 |
| Standby section A | Normal traveling state | 0 |
| Standby section A | Standby state | 3 |
| Standby section A | Limited traveling state | 0 |
| Standby section B | Normal traveling state | 1 |
| Standby section B | Standby state | 2 |
| Standby section B | Limited traveling state | 0 |

D01

| Approach direction | Passage possibility |
|---|---|
| A | x |

D02

D04

| Approach direction | Number of standby vehicles | Standby permutation ID | Standby order | Leaving direction |
|---|---|---|---|---|
| A | 2 | A2-00001 | 1 | C |
| A | 2 | A2-00001 | 2 | C |
| A | 2 | A2-00002 | 1 | C |
| A | 2 | A2-00002 | 2 | D |
| A | 2 | A2-00003 | 1 | D |
| A | 2 | A2-00003 | 2 | C |
| A | 2 | A2-00004 | 1 | D |
| A | 2 | A2-00004 | 2 | D |
| ... | ... | ... | ... | ... |

F I G. 15

D05

| Standby permutation ID | Standby order | Standby position (mm) | Transit time (msec) |
|---|---|---|---|
| A2-00001 | 1 | 0 | 5012 |
| A2-00001 | 2 | -998 | 6622 |
| A2-00002 | 1 | 0 | 5012 |
| A2-00002 | 2 | -1121 | 8711 |
| A2-00003 | 1 | 0 | 5012 |
| A2-00003 | 2 | -1039 | 7185 |
| A2-00004 | 1 | 0 | 5012 |
| A2-00004 | 2 | -988 | 6622 |
| ... | ... | ... | ... |

F I G. 16

| Approach direction | Line length | Maximum wait time (msec) | Average flow rate (min) |
|---|---|---|---|
| A | 3 | 4059 | 11 |
| B | 4 | 12033 | 7 |

| Line length weight | Maximum wait time weight | Average flow rate weight | Threshold |
|---|---|---|---|
| 1000 | 1 | 100 | 1200 |

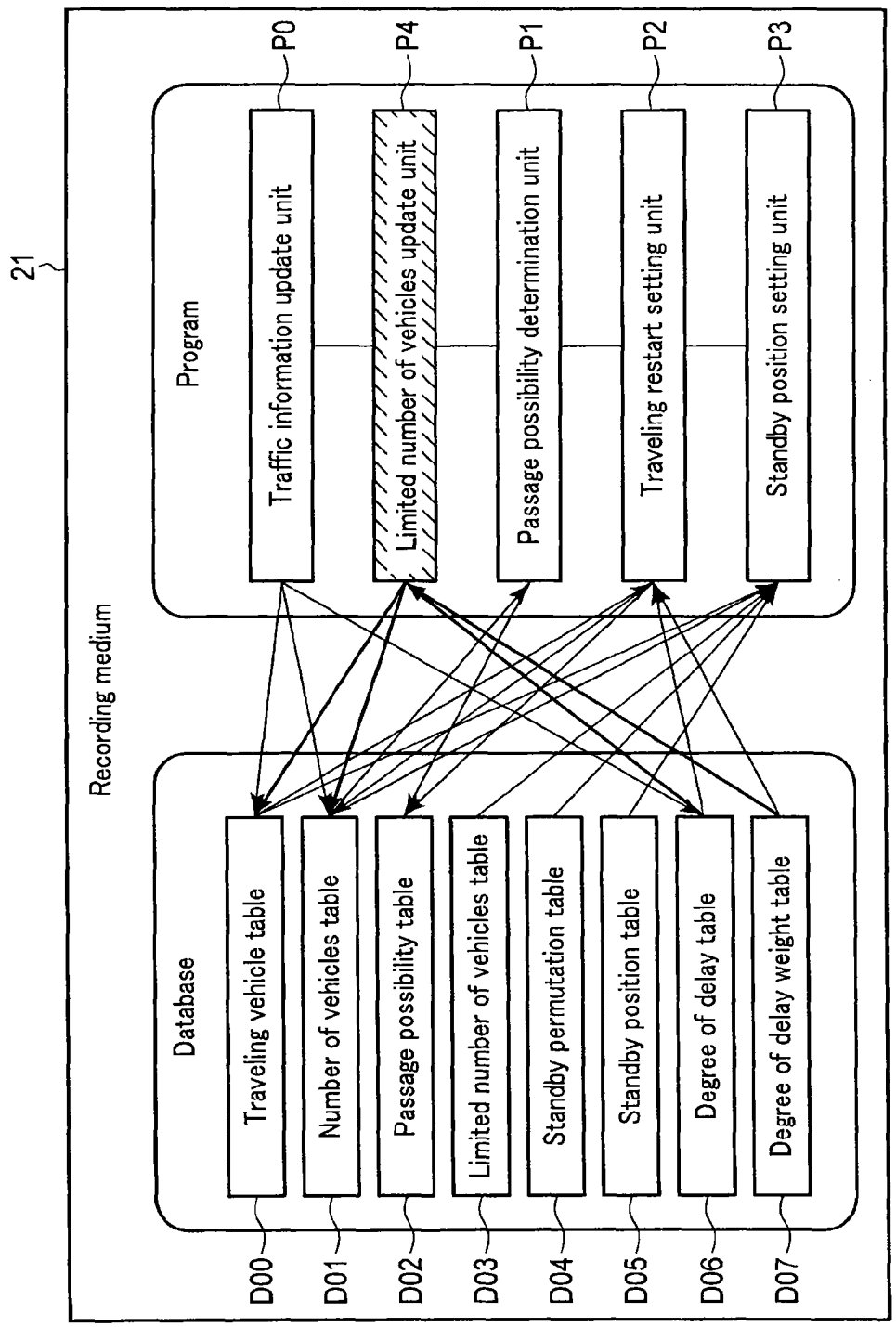
F I G. 22

| Standby permutation D1 | Standby permutation D2 | Transit time (msec) |
|---|---|---|
| A3-00004 | B2-00001 | 25872 |
| A0-00012 | B2-00006 | 22010 |
| ... | ... | ... |

| Traveling vehicle ID before reallocation | Traveling vehicle ID after reallocation |
|---|---|
| #1234 | #0078 |
| #0078 | #0105 |
| #0105 | #1234 |
| ... | ... |

D09

F I G. 27

AUTOMATIC TRAVELING VEHICLE SYSTEM, CONTROL METHOD AND PROGRAM

CROSS-REFERENCE TO RELATED APPLICATIONS

This application is based upon and claims the benefit of priority from the prior Japanese Patent Application No. 2014-050170, filed Mar. 13, 2014, the entire contents of which are incorporated herein by reference.

FIELD

Embodiments described herein relate generally to a standby method of traveling vehicles in an autonomous distributed automatic traveling vehicle system, and in particular, relate to an automatic traveling vehicle system, a control method, and a program that maximize the number of passing vehicles per unit time in an area like a junction having a plurality of approach directions and for which the number of vehicles permitted to enter at a time is limited by instructing a standby position before the area.

BACKGROUND

In recent years, systems enabling a vehicle to maintain a constant speed without needing a driver's accelerator operation and systems allowing a vehicle to travel by always measuring the distance to the forward vehicle and automatically keeping an appropriate distance between vehicles have been developed. Further, systems enabling a vehicle to travel by keeping left along the road without depending on a driver's wheel operation have been developed.

In factories and warehouses, the introduction of an automatic traveling vehicle system in autonomous distributed control that causes an unmanned vehicle to travel to its destination is being studied.

In an automatic traveling vehicle system in autonomous distributed control, the direction and the number of vehicles permitted to enter the relevant area at a time are limited to avoid collision with other vehicles at a junction and due to the limitation, the amount of passing flow at the junction decreases and traveling efficiency of the whole system declines under the influence thereof.

BRIEF DESCRIPTION OF THE SEVERAL VIEWS OF THE DRAWING

FIG. 4 is a diagram showing an example of limited sections/standby sections in the first embodiment;

FIG. 15 is a diagram showing an example of a standby permutation table in the first embodiment;

FIG. 16 is a diagram showing an example of a standby position table in the first embodiment;

FIG. 22 is a block diagram showing a concrete configuration of a limited section controller in a third embodiment;

FIG. 27 is a diagram showing an example of a reallocated traveling vehicle ID table in the fourth embodiment.

DETAILED DESCRIPTION

In general, according to one embodiment, an automatic traveling vehicle system includes, a traveling vehicle, a traveling path, and a limited section controller. The traveling vehicle automatically controls traveling of the traveling vehicle based on traveling information relative to a forward vehicle. The traveling path includes a junction provided with a limited section to avoid a collision between the traveling vehicles. The limited section controller exercises control whether to permit the traveling vehicle to pass by monitoring delay conditions of the traveling vehicle at least near the junction in the limited section. The limited section controller includes a traffic information update unit, a determination unit, a standby position setting unit, and a traveling restart setting unit. The traffic information update unit updates delay information of the traveling vehicle near the junction. The determination unit determines whether to permit the traveling vehicle to pass based on whether there is the traveling vehicle in the limited section obtained from the delay information updated. The standby position setting unit sets a standby position of each of the traveling vehicles of a limited number or less present in a standby section before the limited section, when the limited section is not passable. The traveling restart setting unit determines an approach direction into the limited section for which traveling is restarted and causes the traveling vehicle on standby in the standby section in the approach direction to restart to travel, when the limited section is passable.

(First Embodiment)

Hereinafter, the first embodiment of an automatic traveling vehicle system will be described.

Figure 1:
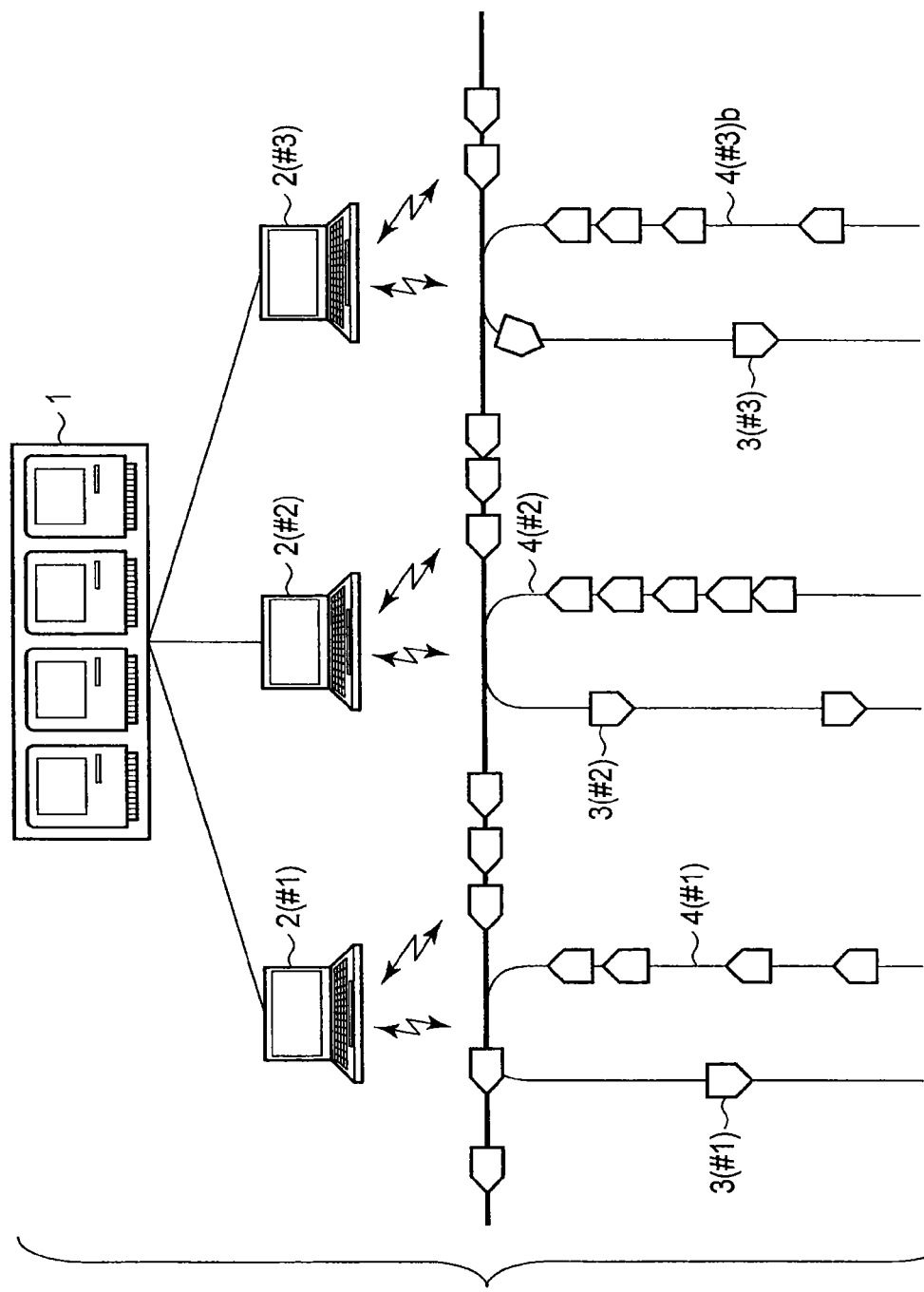
FIG. 1 is a schematic diagram of an automatic traveling vehicle system according to a first embodiment.

FIG. 1 is a schematic diagram showing the configuration of an automatic traveling vehicle system according to the first embodiment.

The automatic traveling vehicle system includes a host system 1 that controls the whole system in real time, limited section controllers 2(#1), 2(#2), 2(#3) that control traveling at each junction based on information of traveling vehicles from the host system 1, traveling vehicles 3(#1), 3(#2), 3(#3) that automatically travel while receiving instructions from the limited section controllers 2(#1), 2(#2), 2(#3) at a junction, and traveling paths 4(#1), 4(#2), 4(#3) including tracks for the traveling vehicles 3(#1), 3(#2), 3(#3) to travel. A sub-system or a sub-controller whose control range is different may be present between the host system 1 and the limited section controllers 2(#1), 2(#2), 2(#3) or further above the host system 1.

Figure 2:
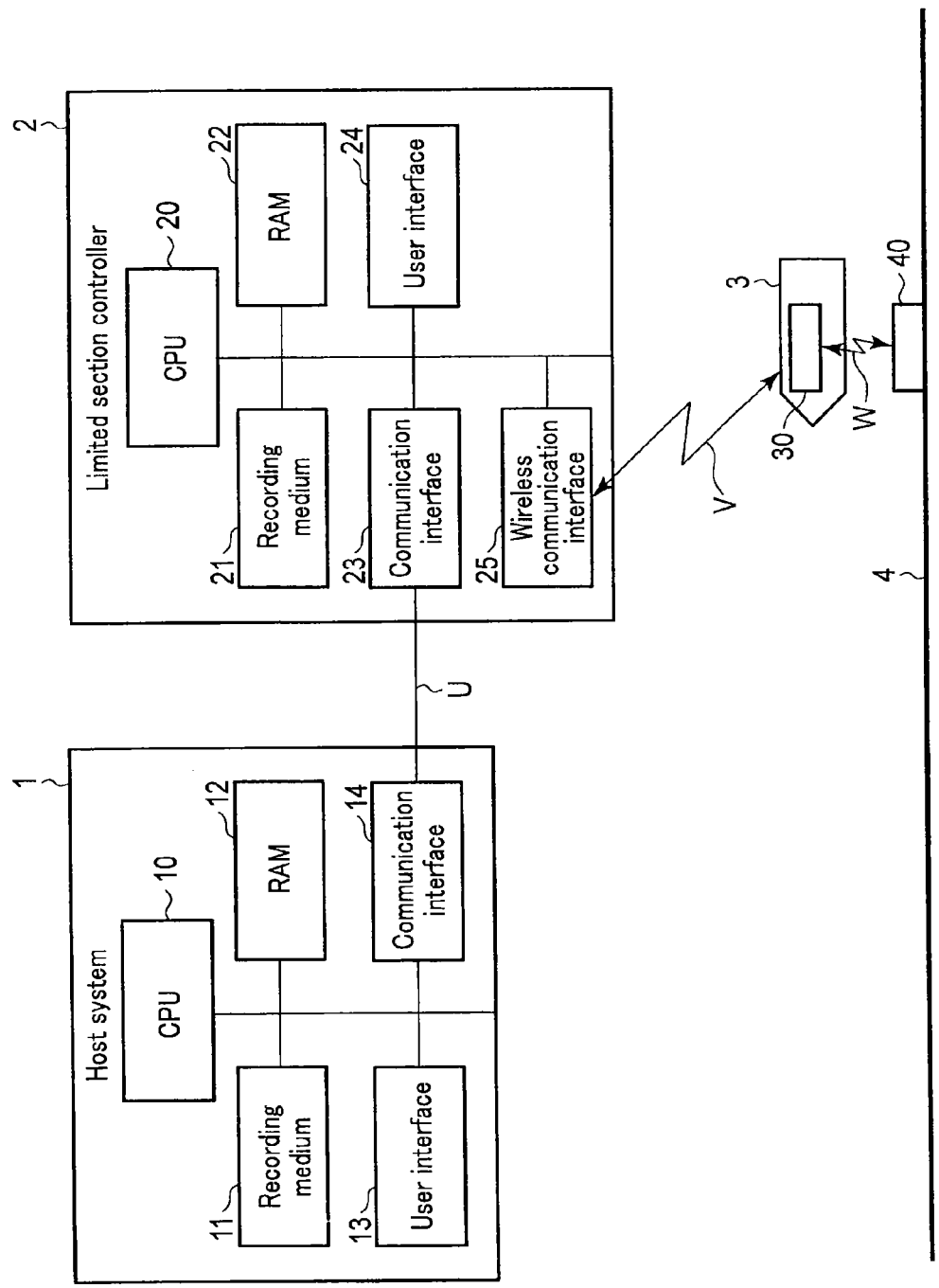
FIG. 2 is a block diagram showing a concrete configuration of the automatic traveling vehicle system according to the first embodiment.

FIG. 2 is a block diagram showing the configuration of the first embodiment using a computer.

The host system 1 includes a CPU 10, a recording medium 11, a RAM 12, a user interface 13, a communication interface 14 and the like.

The CPU 10 is connected to each hardware unit as described above via a bus to control such units and also executes a computer program stored in the recording medium 11 one after another.

The recording medium 11 is configured by a Hard Disk Drive (HDD), a Solid State Disk (SSD) or the like and has a computer program necessary to control an automatic traveling vehicle system stored therein.

The RAM 12 is configured by SRAM, DRAM, flash memories and the like and when the CPU 10 is executed, reads a computer program and the like stored in the recording medium 11 to temporarily store such a program if necessary.

The user interface 13 is configured by a display, a keyboard, a mouse and the like and enables acceptance of input from the user and output of information to the user.

The communication interface 14 is an interface to connect to LAN (U) built on premises of an automatic traveling vehicle system and communicates with the limited section controller 2 and other systems through LAN (U).

The limited section controller 2 includes a CPU 20, a recording medium 21, a RAM 22, a communication interface 23, a user interface 24, a wireless communication interface 25 and the like.

The CPU 20 is connected to each hardware unit as described above via a bus to control such hardware units and also sequentially executes a computer program stored in the recording medium 21.

The recording medium 21 is configured by HDD, SSD and the like and has a computer program necessary to control traveling vehicles at a junction stored therein.

The RAM 22 is configured by SRAM, DRAM, flash memories and the like and when the CPU 20 is executed, reads a computer program and the like stored in the recording medium 21 to temporarily store such a program if necessary.

The communication interface 23 is used to communicate with the host system 1 via LAN (U).

The user interface 24 is configured by a display, a keyboard, a mouse and the like and enables acceptance of input from the user and output of information to the user.

The wireless communication interface 25 communicates with a traveling vehicle to transmit and receive position information and state of the traveling vehicle via wireless communication (V).

The traveling vehicle 3 has a controller 30 including a transmitter-receiver unit to exchange information with the limited section controller 2 mounted thereon via wireless communication. The controller 30 has information necessary for traveling such as a traveling job allocated by the host system 1, the destination, the route and the like and also holds the current position of the traveling vehicle 3 and a state necessary to receive control from the limited section controller 2 at a junction. The traveling job, the destination, and the route will be described later.

Figure 3:
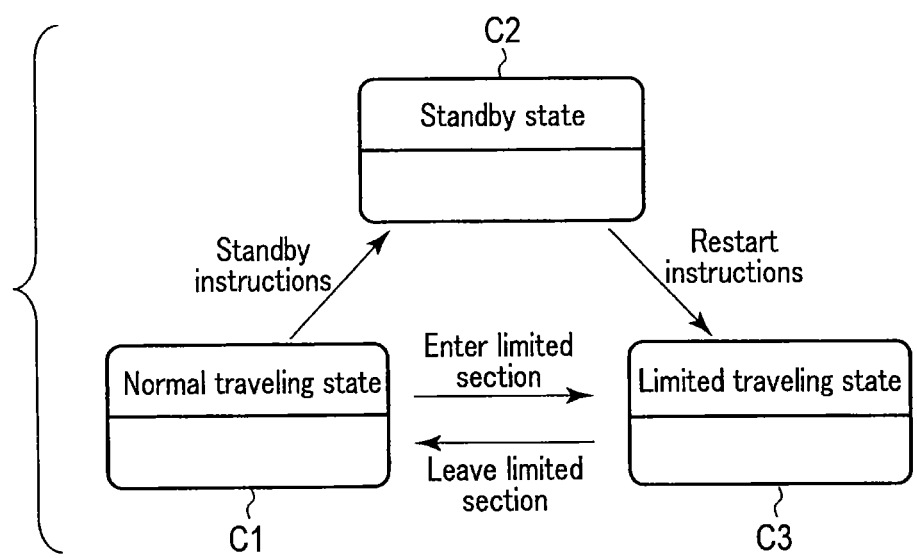
FIG. 3 is a state transition diagram of a traveling vehicle in the first embodiment.

First, the current position of the traveling vehicle 3 is updated by integrating the value of a speed sensor mounted on the traveling vehicle 3 or receiving wireless communication (W) from transmitter units 40 to transmit position information installed in predetermined positions of the traveling path 4. Next, the state of the traveling vehicle 3 will be described using FIG. 3.

The state that can be assumed by the traveling vehicle 3 is one of the following three states.

The traveling vehicle is in a "normal traveling state C1" when traveling outside a junction, that is, outside a control range of the limited section controller 2, in a "standby state C2" when stopping in a standby section before a limited section or traveling before a planned stop, and in a "limited traveling state C3" when passing through a limited section. The limited section and the standby section will be described later.

When the traveling vehicle 3 in the normal traveling state C1 enters a standby section and receives standby instructions from the limited section controller 2, the state changes to the standby state C2 and instructions are issued to the servo system of the traveling vehicle 3 so as to be able to stop in a standby position. When the traveling vehicle 3 in the normal traveling state C1 or the standby state C2 enters a limited section and receives a signal from the limited section controller 2, the state of the vehicle changes to the limited traveling state C3 and then changes to the normal traveling state C1 when the vehicle quits the limited section.

The traveling method in each state can be characterized that while the traveling vehicle 3 in the normal traveling state C1 or the limited traveling state C3 travels to the destination allocated by the host system 1 along the route, the traveling vehicle 3 in the standby state C2 travels so as to stop in a standby position in the form of interrupting standby instructions from the limited section controller 2. In all states, the traveling vehicle is accelerated or decelerated in accordance with relative information such as the distance between the current position and the forward vehicle.

This completes an overall description of the automatic traveling vehicle system and hereinafter, an embodiment of the limited section controller 2 that exercises control to be the focus of the first embodiment.

FIG. 4 is a schematic diagram of a junction of the type in which the traveling vehicle 3 approaches from an approach direction A or an approach direction B and quits from a leaving direction C or a leaving direction D and hereinafter, the limited section controller 2 will be described based on the example of this figure. FIG. 4 is only an example of the junction contained in the automatic traveling vehicle system and the present embodiment is not limited to the type in FIG. 4.

A limited section 41 to avoid a collision between the traveling vehicles 3 is provided in an intersection portion of the junction in FIG. 4 and limitations are imposed in the limited section 41 such that the traveling vehicles 3 do not approach from the approach direction A and the approach direction B at the same time. Before the limited section 41, a standby section A42a is provided on the side of the approach direction A and a standby section B42b is provided on the side of the approach direction B and these are sections to stop before entering the limited section 41 if necessary.

The traveling vehicles 3 are divided based on the above sections.

The traveling vehicles 3 present in the limited section 41 are denoted as traveling vehicles 31, the traveling vehicles 3 present in the standby section A42a are denoted as traveling vehicles 32a, the traveling vehicles 3 present in the standby section A42b are denoted as traveling vehicles 32b, and the traveling vehicles 3 other than the above traveling vehicles are denoted as traveling vehicles 33. Among these traveling vehicles, the traveling vehicles 31, the traveling vehicles 32a(#1), 32a(#2), 32a(#3), and the traveling vehicles 32b(#1), 32b(#2), 32b(#3) are to be controlled by the limited section controller 2 and exchange information via wireless communication (V).

States of the traveling vehicles are as follows:

The state of the traveling vehicle 33 is the normal traveling state C1. The state of the traveling vehicle 31 is the limited traveling state C3. The state of the traveling vehicle 32a or the traveling vehicle 32b can assume any of the normal traveling state C1, the standby state C2, and the limited traveling state C3. This depends on the presence/absence of standby instructions and retransmission instructions from the limited section controller 2 and details thereof will be described later. In a strict sense, the state of each section is not updated between the time when the traveling vehicle 3 enters or leaves each section and the time when the limited section controller 2 and the relevant traveling vehicle 3 communicate to update the state and is not as described above.

Figure 5:
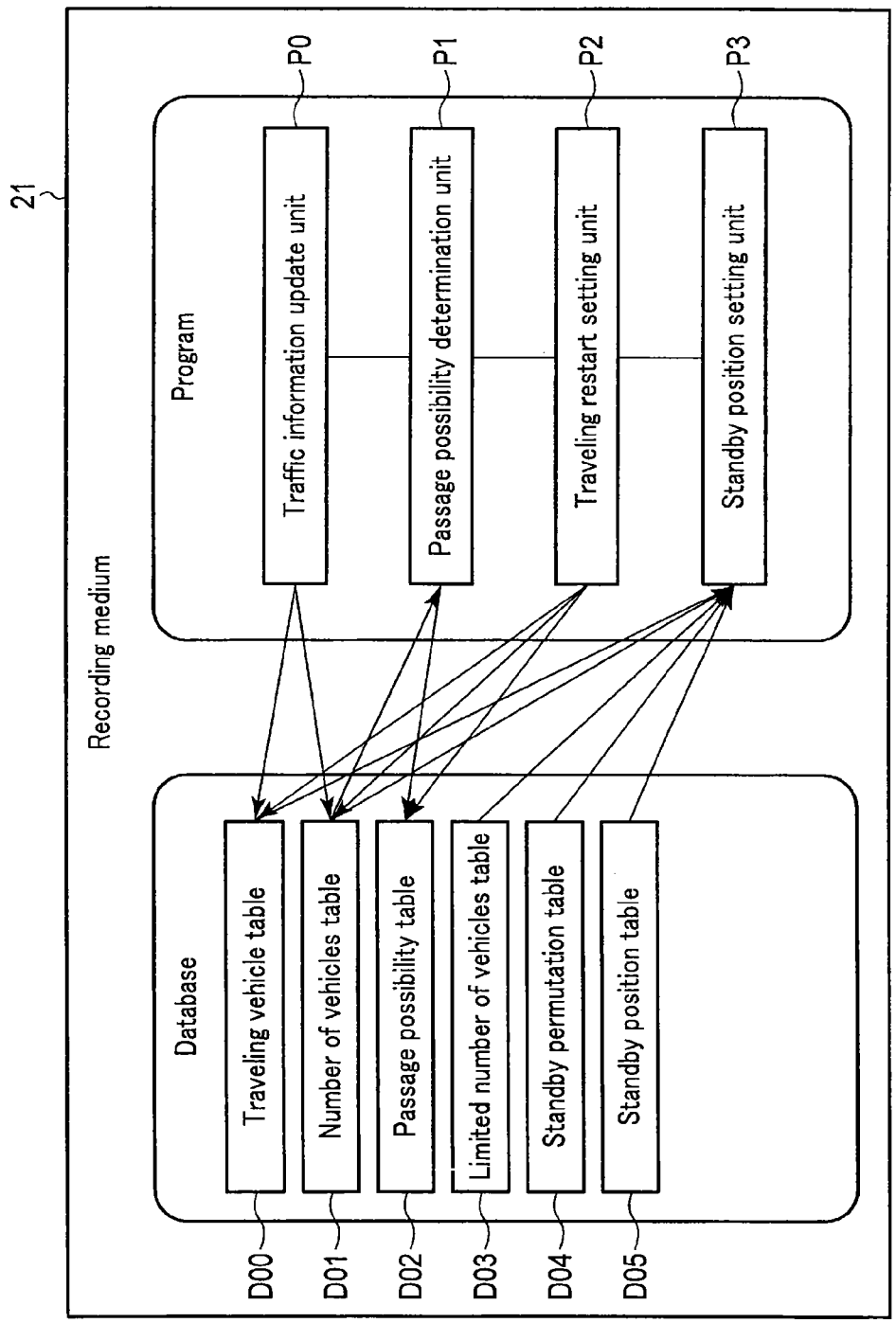
FIG. 5 is a block diagram of a limited section controller in the first embodiment.

FIG. 5 is a block diagram showing the configuration of a computer program and a database stored in the recording medium 21 of the limited section controller 2.

A traveling vehicle table D00, a number of vehicles table D01, a passage possibility table D02, a limited number of vehicles table D03, a standby permutation table D04, and a standby position table D05 are provided in the database of the recording medium 21. A traffic information update unit P0, a passage possibility determination unit P1, a traveling restart setting unit P2, and a standby position setting unit P3 are provided in the program of the recording medium 21.

The traffic information update unit P0 is a program that updates delay information of traveling vehicles near a junction by referring to the traveling vehicle table D00 and the number of vehicles table D01. The passage possibility determination unit P1 is a program that determines whether to permit vehicles to pass based on whether there is any traveling vehicle in a limited section by referring to the number of vehicles table D01 and the passage possibility table D02.

The traveling restart setting unit P2 is a program that, when a limited section is determined to be passable by the passage possibility determination unit P1, determines the approach direction to the limited section for which traveling is restarted and restarts traveling of traveling vehicles on standby in the standby section in the approach direction. The standby position setting unit P3 is a program that, when a limited section is determined to be unpassable by the passage possibility determination unit P1, sets the standby position of each of traveling vehicles of the limited number or less present in the standby section before the limited section.

Figure 6:
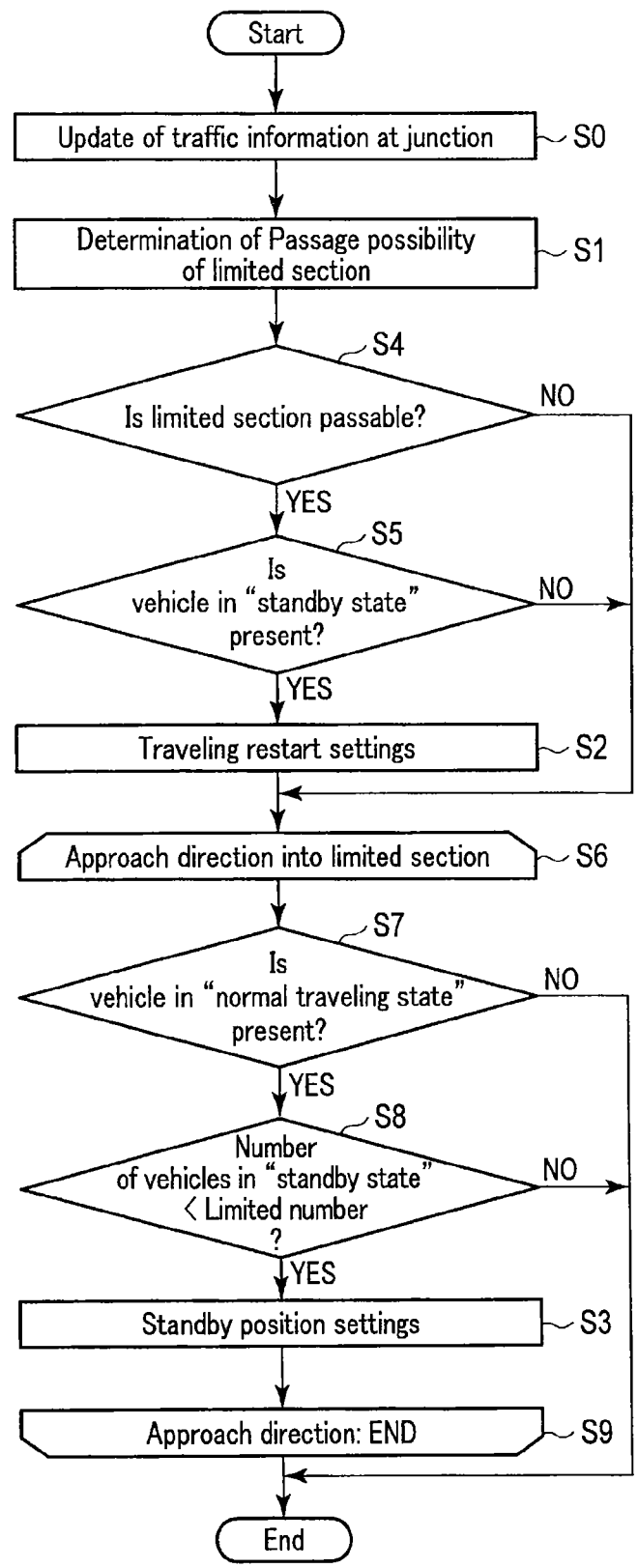
FIG. 6 is a flow chart showing a control processing procedure of the limited section controller in the first embodiment.

The operation of the block in FIG. 5 will be described based on the flow chart in FIG. 6.

(Traffic Information Update Step S0 of the Junction)

The traffic information update unit P0 receives position information and the state from the traveling vehicle 31 present in the limited section 41, the traveling vehicles 32a(#1), 32a(#2), 32a(#3) present in the standby section A42a, and the traveling vehicles 32b(#1), 32b(#2), 32b(#3) present in the standby section A42b via wireless communication (V), calculates the states of the traveling vehicles 3 in accordance with the position, and updates the traveling vehicle table D00, the number of vehicles table D01, and the standby permutation table D04 on a predetermined update timing of limited section controller 2. The traffic information update unit P0 also transmits the updated states to the traveling vehicle 31 and the traveling vehicles 32a(#1), 32a(#2), 32a(#3), 32b(#1), 32b(#2), 32b(#3) via wireless communication (V). It is assumed that the traveling vehicles 33 are present in sections other than the limited section 41 and the standby sections A42a, A42b.

(Passage Possibility Determination Step S1 of the Limited Section)

The passage possibility determination unit P1 acquires the occupancy of the limited section 41 from the number of vehicles table D01 and updates the passage possibility table D02.

(Traveling Restart Setting Step S2)

If the passage possibility table D02 indicates that passage is possible (step S4) and the traveling vehicle 3 in the standby state C2 is present in the standby section A42a or the standby section A42b (step S5), the traveling restart setting unit P2 performs the following processing.

The traveling restart setting unit P2 determines the approach direction in which traveling should be restarted next from the approach direction made passable last time and updates the passage possibility table D02. Next, the traveling restart setting unit P2 updates the state of the traveling vehicle 3 in the standby section in the approach direction in which traveling should be restarted and updates the traveling vehicle table D00 and the number of vehicles table D01. The traveling restart setting unit P2 also transmits the updated states to the traveling vehicles 32a(#1), 32a(#2), 32a(#3) or 32b(#1), 32b(#2), 32b(#3) via wireless communication (V).

(Standby Position Setting Step S3)

If the traveling vehicle 3 in the normal traveling state C1 is present in the standby section A42a or the standby section A42b (step S7) and the number of the traveling vehicles 3 in the standby state C2 is less than the limited number of the limited number of vehicles table D03 (step S8) for each of the approach direction A and the approach direction B (iterative processing of steps S6 to S9), the standby position setting unit P3 performs the following processing.

The standby position setting unit P3 selects the traveling vehicles 3 in the standby state C2 and the traveling vehicles 3 that are in the normal traveling state C1, but should be brought to the standby state C2 as standby instruction targets and acquires the standby positions of the relevant traveling vehicles 3 from the standby permutation table D04 and the standby position table D05. The standby position setting unit P3 changes the state of the traveling vehicles 3 selected for the standby instruction targets to the standby state C2 and updates the traveling vehicle table D00 and the number of vehicles table D01. The standby position setting unit P3 also transmits the updated states to the traveling vehicles 32a (#1), 32a(#2), 32a(#3) or 32b(#1), 32b(#2), 32b(#3) via wireless communication (V).

Hereinafter, steps S0 to S3 corresponding to the operations of units P0 to P3 will be described in detail using each flow chart and table examples. The configuration of each table and data examples are examples to describe the present embodiment and are not limited to the present invention. It may become practically necessary to manage each table as history data by adding the data registration time and the registered user name to the configuration of each table, but the description thereof is omitted in the present embodiment and mentioned only when necessary.

Figures 7, 8:
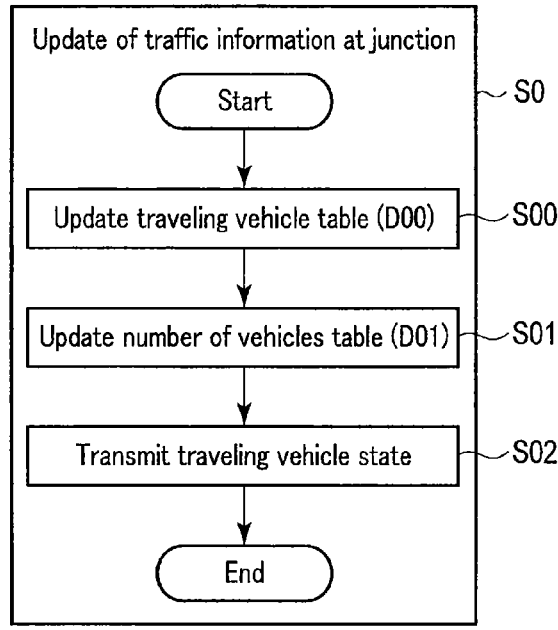
FIG. 7 is a flow chart of updating traffic information in the first embodiment.
FIG. 8 is a diagram showing an example of a traveling vehicle table in the first embodiment.

FIG. 7 is a flow chart showing processing of the traffic information update step S0 of a junction.

The traffic information update unit P0 updates the traveling vehicle table D00 of the traveling vehicles 3 present in the limited section 41, the standby section A42a, or the standby section A42b based on acquired information (S00). FIG. 8 shows an example of the traveling vehicle table D00. The traveling vehicle table D00 includes information of the traveling vehicle ID, state, approach direction, leaving direction, traveling job ID, destination ID, route ID, and current position. Each piece of information of the traveling vehicle table D00 will be supplementary described.

The traveling vehicle ID is a number of a character string allocated by the host system 1 to identify the traveling vehicle 3 and is acquired from the traveling vehicle 3 via wireless communication (V). The state is, as described above, one of the normal traveling state C1, the standby state C2, and the limited traveling state C3 and is acquired from the traveling vehicle 3 via wireless communication (V). The approach direction is one of A and B and is identified from the route ID described later. The leaving direction is one of C and D and is identified, like the approach direction, from the route ID described later. The traveling job ID is a number or a character string allocated by the host system 1 in accordance with the current traveling purpose of the traveling vehicle 3 and the traveling job ID tied to the corresponding traveling vehicle ID is acquired via LAN (U) in the host system 1.

As the traveling purpose of the traveling vehicle 3 in the case of, for example, an automatic transportation vehicle of a factory, (A) traveling to receive half-finished products before processing from a storage rack, (B) transporting half-finished products before processing to equipment planned for processing, (C) traveling to receive half-finished products after processing, (D) transporting half-finished products after processing to the storage rack, and (E) patrolling without any purpose can be cited and the traveling job ID is to be uniquely allocated to each piece of travel so that the above purpose can be identified. The route ID is a number or a character string allocated by the host system 1 and containing information allowing to identify the traveling path 4 for the traveling job ID and the route ID tied to the relevant traveling job ID in the host system 1 is acquired via LAN (U).

Therefore, the approach direction and the leaving direction can be identified based on route information indicated by the route ID. The current position represents the distance from the entry point of the limited section 41 (takes on a negative value in the standby section A42a or the standby section A42b, 0 on the border between the standby section A42a or the standby section A42b and the limited section 41, and a positive value in the limited section 41) and is acquired from the traveling vehicle 3 via wireless communication (V).

Figures 9, 10:
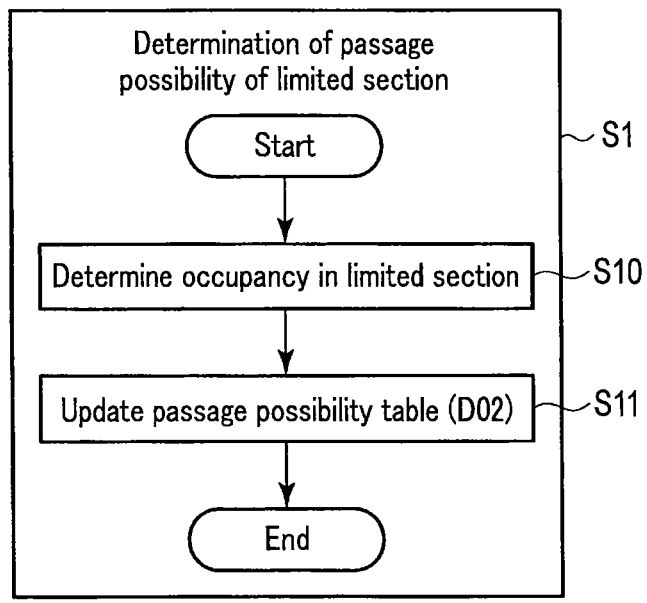
FIG. 9 is a diagram showing an example of a number of vehicles table in the first embodiment.
FIG. 10 is a flow chart to determine whether to permit a vehicle to pass in the first embodiment.

Next, the traffic information update unit P0 updates the number of vehicles table D01 based on the traveling vehicle table D00 (step S01). FIG. 9 shows an example of the number of vehicles table D01. The number of vehicles table D01 includes information of the section, state, and number of vehicles. The section represents the limited section 41, the standby section A42a, or the standby section A42b and the number obtained by compiling records of the traveling vehicle table D00 based on the section and state is stored as the number of vehicles.

Lastly, the traffic information update unit P0 transmits the state to the traveling vehicle 3 based on the traveling vehicle table D00 via wireless communication (V) (step S02). That is, the normal traveling state C1 is transmitted to the traveling vehicle 3 whose leaving the limited section 41 is detected or the traveling vehicle 3 whose entry into the standby section A42a or the standby section A42b is detected to update the state of the traveling vehicles 3.

FIG. 10 is a flow chart showing processing of the passage possibility determination S1 of the limited section by the passage possibility determination unit P1

The passage possibility determination unit P1 determines the occupancy of the limited section 41 based on the number of vehicles table D01 (step S10). The most simple example of occupancy determination in the present embodiment is a method by which the limited section is determined to be unoccupied if the number of vehicles=0 in the section=limited section in the number of vehicles table D01 and determined to be occupied if the number of vehicles=positive value. As a somewhat more complex example, a method by which the limited section is determined to be unoccupied if, based on the traveling vehicle table D00, the number of the traveling vehicles 3 in the state=limited traveling state C3 is one or less and the current position of the traveling vehicle 3=length of the limited section 41−5,000 mm or more (leaving direction=C) or the current position=length of the limited section 41−10,000 mm or more (leaving direction=D) can be cited. However, the determination methods cited here are only examples to describe the present embodiment and do not intend to limit the present invention.

Figures 11, 12:
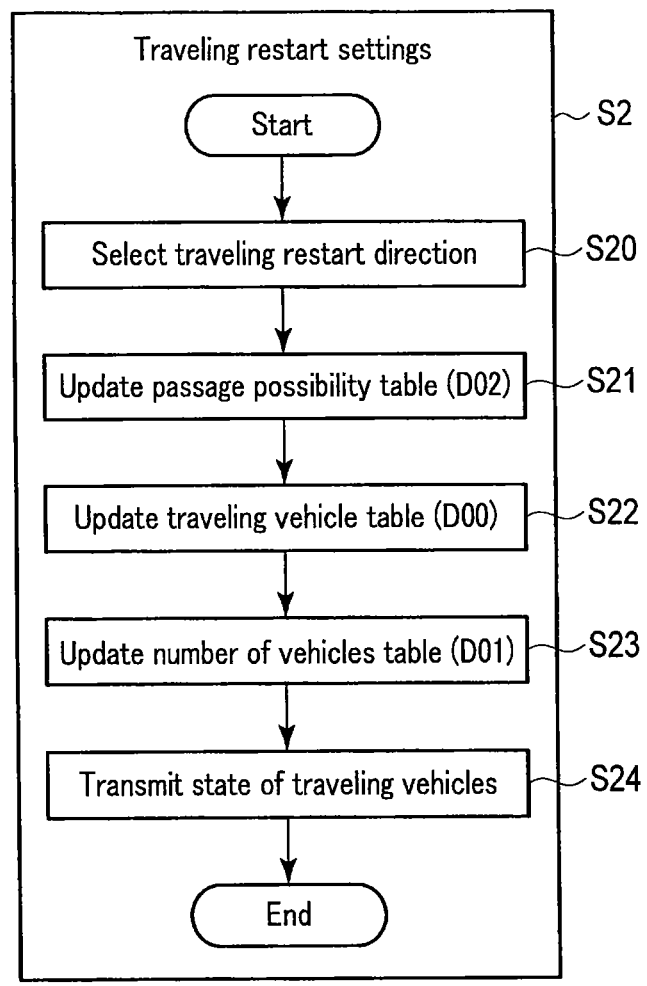
FIG. 11 is a diagram showing an example of a passage possibility table in the first embodiment.
FIG. 12 is a flow chart of traveling restart settings in the first embodiment.

Next, based on the determination result in step S10, the passage possibility determination unit P1 updates the passage possibility table D02 (step S11). FIG. 11 shows an example of the passage possibility table D02. The passage possibility table D02 includes information of the approach direction and passage possibility. The approach direction represents the approach direction A or B of actual passage when passable immediately before and details thereof will be described later. The passage possibility represents a flag of ○ if passable and x if not passable and is updated to ○ if the determination result in step S10 is unoccupied and x if the determination result is occupied.

FIG. 12 is a flow chart showing processing of the traveling restart setting step S2 by the traveling restart setting unit P2.

The traveling restart setting unit P2 selects the traveling restart direction based on the passage possibility table D02 (step S20). As the selection method, the different direction from the last approach direction stored in the approach direction of the passage possibility table D02 is selected. By using the above method, the traveling vehicles 3 can be permitted to pass alternately in the approach directions A, B.

Next, the traveling restart setting unit P2 updates the passage possibility table D02 with the approach direction selected in step S20 (step S21). That is, the record of the approach direction in the passage possibility table D02 is changed to the approach direction selected in S20 and passage possibility thereof is changed to ○ (not passable).

Next, the traveling restart setting unit P2 updates the traveling vehicle table D00 of the traveling vehicles 3 in the standby state C2 in the approach direction selected in step S20 (step S22). That is, among records of the traveling vehicle table D00, records in which the state=standby state C2 and the approach direction=approach direction selected in step S20 are searched for and extracted and the state thereof is updated to the limited traveling state C3.

Next, the traveling restart setting unit P2 updates the number of vehicles table D01 based on the traveling vehicle table D00 (step S23). Accompanying the change of the state from the standby state C2 to the limited traveling state C3 by the processing in S22, the number of traveling vehicles is recompiled.

Lastly, the traveling restart setting unit P2 transmits the state to the traveling vehicle 3 based on the traveling vehicle table D00 via wireless communication (V) (step S24). That is, the traveling restart setting unit P2 detects the traveling vehicles 3 whose state in the traveling vehicle table D00 is changed from the standby state C2 to the limited traveling C3 in step S22 and matching the relevant traveling vehicle IDs and transmits the state of the limited traveling state C3 to update the state of the traveling vehicles 3.

Figures 13, 14:
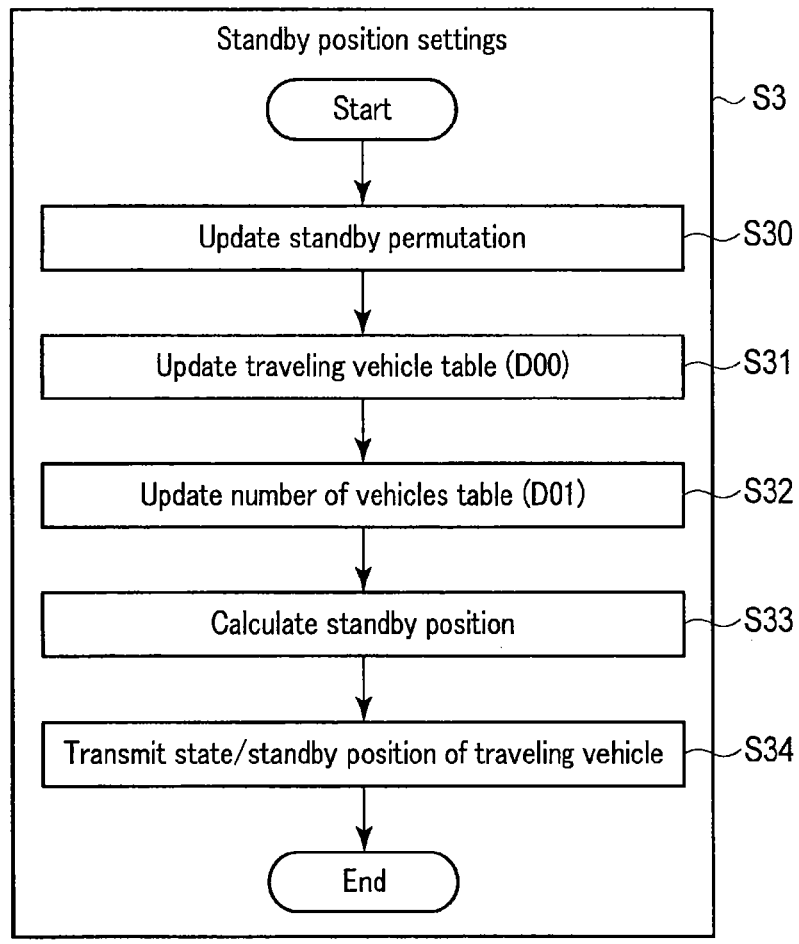
FIG. 13 is a flow chart of standby position settings in the first embodiment.
FIG. 14 is a diagram showing an example of a limited number of vehicles table in the first embodiment.

FIG. 13 is a flow chart showing processing of the standby position setting S3 by the standby position setting unit P3.

The standby position setting unit P3 updates the permutation state (standby permutation) of the traveling vehicles 3 in the standby state C2 based on the traveling vehicle table D00 and the limited number of vehicles table D03 (step S30). FIG. 14 shows an example of the limited number of vehicles table D03. The limited number of vehicles table D03 includes information of the approach direction and limited number of vehicles. The limited number of vehicles table D03 is a table having two records corresponding to the approach directions=A, B. The number of the traveling vehicles 3 that can enter the limited section 41 successively at a time is stored in the limited number of vehicles. Hereinafter, the standby permutation in the approach direction A will be described by taking an example. It is assumed that there are four records in which the approach direction=A and the state=normal traveling state C1 or standby state C2 in the traveling vehicle table D00.

(a1) Traveling vehicle ID=#0001, state=standby state C2, leaving direction=D, current position=0 mm (a2) Traveling vehicle ID=#0002, state=standby state C2, leaving direction=C, current position=−1000 mm (a3) Traveling vehicle ID=#0003, state=normal traveling state C1, leaving direction=C, current position=−2000 mm (a4) Traveling vehicle ID=#0004, state=normal traveling state C1, leaving direction=D, current position=−3000 mm It is also assumed that the limited number of vehicles in the approach direction=A in the limited number of vehicles table D03 is 3. The standby position setting unit P3 sets the standby state C2 to the traveling vehicles 3 of the limited number or less in descending order of current position. In the above example, three vehicles of the traveling vehicle ID=#0001, #0002, #0003 are in the standby state C2 and for the traveling vehicle ID=#0003, the state is different from the current state (normal traveling state C1). The standby permutation represents a permutation in which the leaving direction is arranged following the order from the head in accordance with the approach direction and the number of vehicles in the standby state C2. In the above example, the standby permutation: (D, C, C) is obtained for the approach direction=A and the number of standby vehicles=3. The standby permutation is also obtained in the same manner for the approach direction B.

Next, the standby position setting unit P3 reflects the state of the traveling vehicles 3 updated by the processing in step S30 in the traveling vehicle table D00 (step S31). In the above example, the state of the traveling vehicle ID=#0003 is updated from the normal traveling state C1 to the standby state C2.

Next, the standby position setting unit P3 updates the number of vehicles table D01 based on the traveling vehicle table D00 (step S32). Accompanying the change of the state from the normal traveling state C1 to the standby state C2 by the processing in S31, the number of traveling vehicles is recompiled.

Next, the standby position setting unit P3 calculates the standby position based on the standby permutation calculated in step S30, the standby permutation table D04, and the standby position table D05 (step S33). FIG. 15 shows an example of the standby permutation table D04. The standby permutation table D04 includes information of the approach direction, number of standby vehicles, standby permutation ID, standby order, and leaving direction. The approach direction and the number of standby vehicles represent the approach direction and the number of standby vehicles to define the standby permutation and the standby permutation ID represents a number or a character string allocated by the limited section controller 2 to distinguish the standby permutation in the approach direction and number of standby vehicles (in the above example, the approach direction=A and the number of standby vehicles=3). The standby order and the leaving direction represent the order from the head and the leaving direction in the standby permutation ID respectively.

FIG. 16 shows an example of the standby position table D05. The standby position table D05 includes information of the standby permutation ID, standby order, standby position, and transit time. The traveling vehicle 3 is identified by the standby permutation ID and the standby order and the standby position represents, like the current position of the traveling vehicle 3, the position of stop in a coordinate system in which the entry point of the limited section 41 is set to 0.

The transit time is a total time of elapsed time from the restart of traveling from the relevant standby position until the limited section 41 is left and is reference information in the present embodiment (see the fourth embodiment described later). In the processing in step S33, the standby permutation ID matching the standby permutation calculated in step S30 is searched for and acquired from the standby permutation table D04 and records matching the standby permutation ID are searched for and acquired from the standby position table D05 (as many records as the number of standby vehicles are present) to acquire the standby position corresponding to the standby order of the extracted records.

The method of calculating the standby position of the traveling vehicle 3, which is required to obtain an effect by the present embodiment, will be described. The standby position and the transit time stored in the standby position table D05 are calculated by the following method.

As an example, a case when an equation of motion of the traveling vehicle 3 at time t (t>=0) of the standby order n (n=1, 2, . . . , N; N is the number of standby vehicles) approaching from the approach direction A is given by the following equation.

[Mathematical Formula 1]

$$\frac{d^2}{dt^2}X_n(t+\tau_1+\tau_2) = A\left(V_{k_n}(Y_{mn}(t)) - \frac{d}{dt}X_n(t+\tau_1)\right) \quad \text{(Formula 1)}$$

where $X_n$ (t) is the current position of the traveling vehicle 3 at time t of the standby order n, $\tau_1$ and $\tau_2$ are a time delay of a measuring system before the distance between the traveling vehicle 3 and the forward vehicle and a time delay of a driving system before acceleration/deceleration is switched respectively, $k_n$ is the leaving direction ($k_n$=C or D) of the traveling vehicle 3 of the standby order n, $V_{kn}$ (z) is a target controlled speed in accordance with a distance z between vehicles as an argument defined on the traveling path 4 till the leaving direction $k_n$, $Y_{mn}$ (t) is the distance between the traveling vehicle 3 at time t of the standby order n and the forward vehicle m, and A(z) is controlled acceleration in accordance with a difference z between the target controlled speed and the actual speed.

The forward vehicle m in the distance $Y_{mn}$ (t) between vehicles is m=n−1 when $k_n$=$k_{n-1}$ and $Y_{mn}$ (t)=$X_{n-1}$ (t)−$X_n$ (t)−1 (1; vehicle length) holds, but when $k_n$≠$k_{n-1}$, the traveling direction branches halfway through the limited section 41 and m may not be always n−1 and, for example, $Y_{mn}$ (t) may be given by the distance to the vehicle m=n−2. $V_{kn}$ (z) in (Formula 1) when n=1 is assumed to provide the target controlled speed in accordance with the maximum distance between vehicles. The equation of motion of (Formula 1) is only an example to describe the present embodiment and does not intend to limit the present invention.

If the equation of motion of (Formula 1) is assumed to describe the behavior of the stopped traveling vehicle 3 before the limited section 41 is left after restarting to travel, initial conditions at time t (t<=0) are given by the following equations.

[Mathematical Formula 2]

$$X_n(t) = H_n$$
$$\frac{d}{dt}X_n(t) = 0 \quad \text{(Formula 2)}$$

where $H_n$ is the standby position of the traveling vehicle 3 of the standby order n and satisfies the following inequalities.

[Mathematical Formula 3]

$$0 \geq H_1$$
$$H_{n-1} - l \geq H_n (2 \leq n \leq N)$$
$$H_N - l \geq L \quad \text{(Formula 3)}$$

where L is a position coordinate indicating the entry point of the standby section A42a. A simultaneous equation of motion in (Formula 1) having (Formula 2) as initial conditions has a property of being determined in accordance with a relative distance to the forward vehicle and solutions are successively obtained by solving in ascending order of standby order n. In general, however, it is difficult to analytically obtain an exact solution and normally, an approximate solution of (Formula 1) is obtained by discretizing time t in (Formula 1) and solving the equation by numerical calculation. A solution determined as described above is assumed to be (Formula 4).

[Mathematical Formula 4]

$$\hat{X}_n(t; H_1, \ldots, H_n)(1 \leq n \leq N) \quad \text{(Formula 4)}$$

(Formula 4) shows that the solution $X_n$ (t) i determined as a function of time t and the standby position $H_n$. Using (Formula 4), the time T when the last (standby order N) traveling vehicle 3 leaves the limited section 41 is expressed like (Formula 5).

[Mathematical Formula 5]

$$T = \{t | \hat{X}_N(t; H_1, \ldots, H_N) = M\} \quad \text{(Formula 5)}$$

where M is a position coordinate indicating the leaving point of the limited section 41 in the leaving direction ($k_N$) of the traveling vehicle 3 of the standby order N.

The standby position $H_n$ of the traveling vehicle 3 of the standby order n is numerically determined as a solution of optimization problem that satisfies constraint conditions of (Formula 3) and minimizes the time T in (Formula 5). As a method of determining the optimal solution, the simplex method, the annealing method, the genetic algorithm and the like are used. The standby position $H_n$ and the time T calculated by these methods are tied to the relevant standby permutation ID and standby order n and stored in the standby position table D05.

Lastly, the standby position setting unit P3 transmits information to the traveling vehicles 3 based on the traveling vehicle table D00 and the standby position table D05 via wireless communication (V) (step S34). That is, the state of the standby state C2 and the standby position tied to the relevant standby permutation ID and standby order are transmitted to the traveling vehicles 3 whose state in the traveling vehicle table D00 in step S31 is the standby state C2.

According to the first embodiment, as described above, a plurality of the traveling vehicles 3 that restarts to travel in the limited section 41 minimizes the time to pass through the limited section 41 and maximizes the number of passing vehicles in the limited section 41 per unit time and, as a result, the delay in the limited section 41 can be avoided/eliminated.

(Second Embodiment)

Hereinafter, the second embodiment of an automatic traveling vehicle system will be described.

The second embodiment is an embodiment that enables more efficient traveling by, in addition to the first embodiment, determining the approach direction in which traveling is restarted in consideration of the degree of delay when traveling vehicles on standby at a junction are restarted to travel. The first embodiment and the second embodiment are almost the same excluding a partially different portion and thus, only portions that are different from the first embodiment will be described below.

Figure 17:
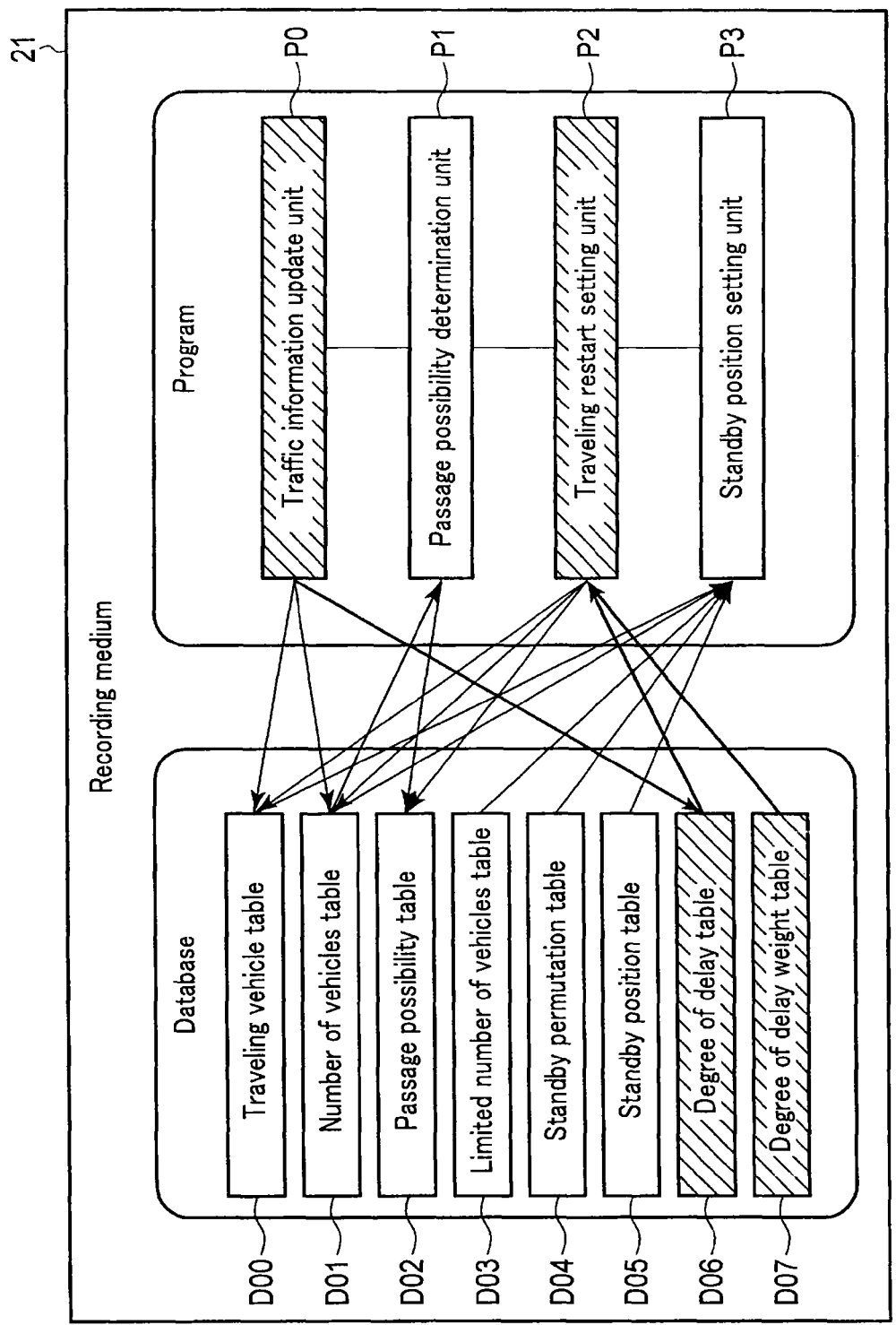
FIG. 17 is a block diagram of a limited section controller in a second embodiment.

FIG. 17 is a block diagram showing the configuration of a computer program and a database of a limited section controller 2 in the second embodiment. What is different from the first embodiment is that a degree of delay table D06 and a degree of delay weight table D07 are added to the database and processing of a traffic information update unit P0 and a traveling restart setting unit P2 is partially changed (highlighted portions in FIG. 17).

Figures 18, 19:
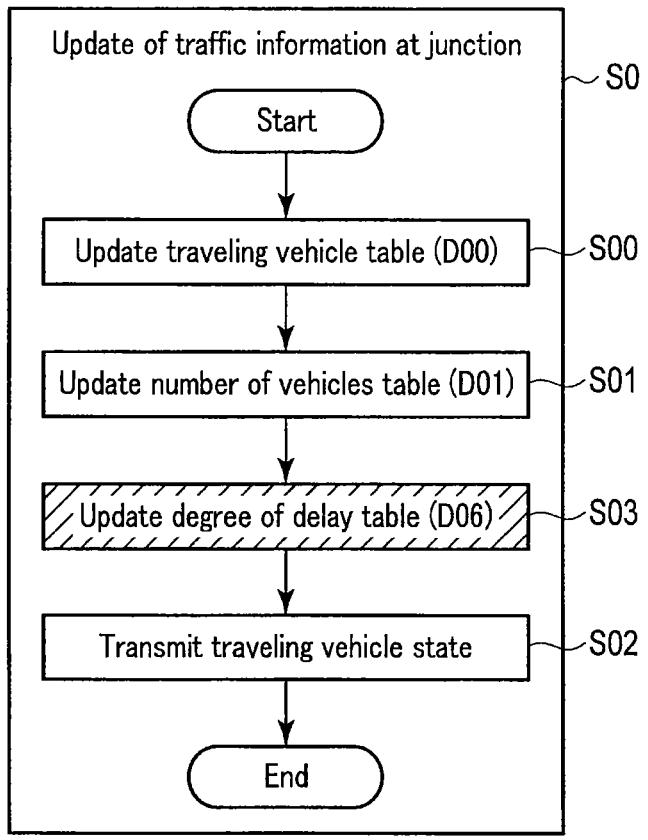
FIG. 18 is a flow chart of updating traffic information in the second embodiment.
FIG. 19 is a diagram showing an example of a degree of delay table in the second embodiment.

FIG. 18 is a flow chart showing processing by the traffic information update unit P0.

What is different from the first embodiment is that an update of the degree of delay table D06 (step S03) is added between step S01 and step S02 (highlighted portion in FIG.

18). The traffic information update unit P0 updates the degree of delay table D06 based on a traveling vehicle table D00 (step S03).

FIG. 19 shows an example of the degree of delay table D06. The degree of delay table D06 includes information of the approach direction, line length, maximum wait time, and average flow rate. Each piece of information of the degree of delay table D06 will be supplementary described. The degree of delay table D06 is a table having two records whose approach direction is A and B. The line length is the number of traveling vehicles 3 in a normal traveling state C1 or a standby state C2 in a standby section A42a or a standby section A42b and is compiled based on the traveling vehicle table D00. As the maximum wait time, among the traveling vehicles 3 in the standby state C2, the longest value of the elapsed time after changing to the standby state C2 is searched for and acquired based on history data of the traveling vehicle table D00. As the average flow rate, the number of the traveling vehicles 3 entering a limited section 41 after leaving the standby section A42a or the standby section A42b is searched for based on history data within a predetermined time of the traveling vehicle table D00 and a value converted into the number per unit time is acquired.

Figures 20, 21:
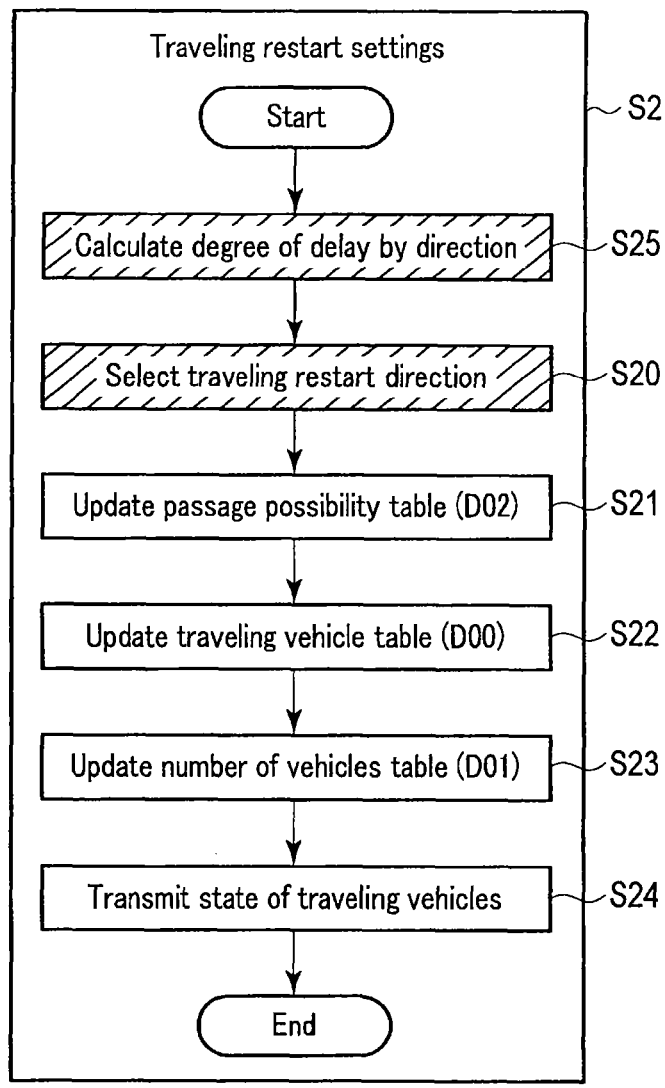
FIG. 20 is a flow chart of traveling restart settings in the second embodiment.
FIG. 21 is a diagram showing an example of a degree of delay weight table in the second embodiment.

FIG. 20 is a flow chart showing processing by the traveling restart setting unit P2.

What is different from the first embodiment is that processing content in step S20 is changed and a calculation of the degree of delay by direction (step S25) is added before step S20 (highlighted portions in FIG. 20).

The traveling restart setting unit P2 calculates the degree of delay by direction of the approach directions A, B based on the degree of delay table D06 and the degree of delay weight table D07 (step S25). FIG. 21 is a diagram showing an example of the degree of delay weight table D07. The degree of delay weight table D07 includes information of the line length weight, maximum wait time weight, average flow rate weight, and threshold. The degree of delay weight table D07 is a table of one record only. Positive coefficients to calculate the degree of delay by direction described later are stored in the line length weight, maximum wait time weight, and average flow rate weight. The threshold is a positive value to determine whether an approach direction has a degree of delay justifying preferential passage.

Hereinafter, the method of calculating the degree of delay by direction will be described by taking the approach direction A as an example. If the line length of a record of the approach direction=A in the degree of delay table D06 is $Q_A$, the maximum wait time is $W_A$, and the average flow rate is $F_A$ and the line length of a record of the degree of delay weight table D07 is CQ, the maximum wait time weight is CW, and the average flow rate weight is CF, the degree of delay by direction $J_A$ in the approach direction A is calculated by the following formula:

[Mathematical Formula 6]

$$J_A = CQ \times Q_A + CW \times W_A + CF \times F_A \quad \text{(Formula 6)}$$

A similar formula applies to the approach direction B. The degree of delay by direction is calculated from the line length, maximum wait time, and average flow rate in the present embodiment, but the present invention is not limited to the above three values and any index representing the level of congestion of the traveling vehicles 3 in each approach direction may be used. In such a case, the description of the present embodiment may be reinterpreted by storing information necessary for calculating the degree of delay by direction in the degree of delay table D06 and coefficients thereof in the degree of delay weight table D07.

Next, the traveling restart setting unit P2 selects the traveling restart direction based on the degree of delay by direction calculated in step S25, the passage possibility table D02, and the degree of delay weight table D07 (step S20). As the selection method, if the difference of the degrees of delay by direction in the approach directions A, B is equal to the threshold or larger, the approach direction with a larger degree of delay by direction is selected and if there is no difference, a different approach direction from the approach direction in the passage possibility table D02 is selected. A case when the difference the degree of delay by direction in the approach direction A and that in the approach direction B is equal to the threshold or larger indicates that, for example, the following formula holds:

[Mathematical Formula 7]

$$J_A > J_B + TH \quad \text{(Formula 7)}$$

where TH is the threshold of the degree of delay weight table D07. A similar criterion formula holds when the degree of delay in the approach direction B is larger than that in the approach direction A.

According to the second embodiment, as described above, the traveling restart setting unit P2 determines the approach direction in which traveling should be restarted next by considering not only updated delay information, but also the approach direction passable in the past and delay conditions of traveling vehicles in each approach direction stored in the degree of delay table D06 and the degree of delay weight table D07 and therefore, the delay at a junction can efficiently be avoided/eliminated.

(Third Embodiment)

Hereinafter, the third embodiment of an automatic traveling vehicle system will be described.

The third embodiment is an embodiment that enables more efficient traveling by, in addition to the second embodiment, dynamically changing the limited number of traveling vehicles permitted to pass through a limited section at a time in consideration of the degree of delay. The second embodiment and the third embodiment are almost the same excluding a partially different portion and thus, only portions that are different from the second embodiment will be described below.

FIG. 22 is a block diagram showing the configuration of a computer program and a database of a limited section controller 2 in the third embodiment. What is different from the second embodiment is that a limited number of vehicles update unit P4 is added to the computer program (highlighted portion in FIG. 22).

Figure 23:
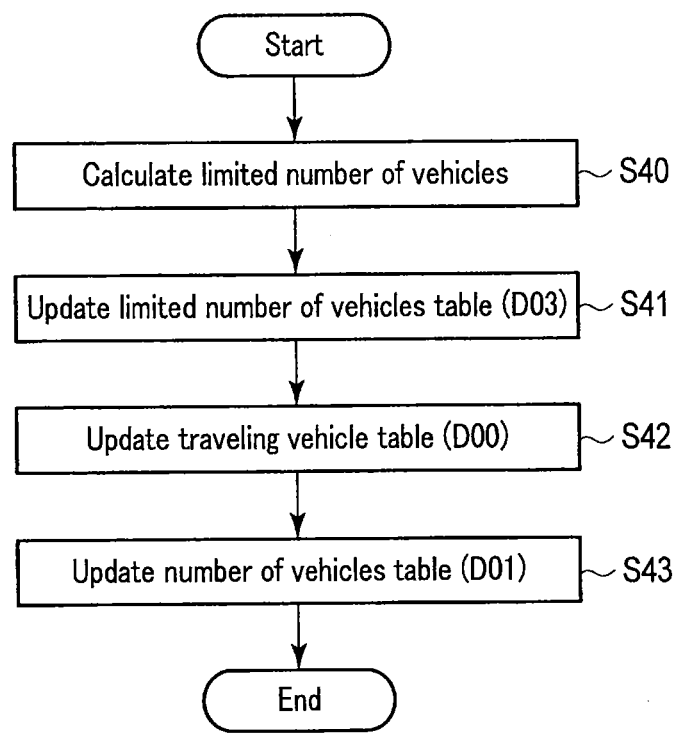
FIG. 23 is a flow chart of updating the limited number of vehicles in the third embodiment.

FIG. 23 is a flow chart showing processing by the limited number of vehicles update unit P4.

The limited number of vehicles update unit P4 calculates the limited number of traveling vehicles by approach direction based on a degree of delay table D06 and a degree of delay weight table D07 (step S40). Degrees of delay by direction $J_A$, $J_B$ in approach directions A, B are given by (Formula 6). Limited numbers $N_A$, $N_B$ in the approach directions A, B are calculated by the following formula if, for example, a reference limited number is N:

[Mathematical Formula 8]

$$N_A = \text{round}\left[\frac{2NJ_A}{J_A + J_B}\right]$$
$$N_B = \text{round}\left[\frac{2NJ_B}{J_A + J_B}\right]$$ (Formula 8)

where round [•] is a value obtained by rounding off an argument to the nearest integer. (Formula 8) is an example to describe the present embodiment and does not intend to limit the present invention and any calculation formula that changes the limited number in accordance with the degree of delay by direction may be used.

Next, the limited number of vehicles update unit P4 updates the limited number of vehicles table D03 with the value calculated by (Formula 8) (step S41).

Next, the limited number of vehicles update unit P4 updates the traveling vehicle table D00 based on the updated limited number (step S42). That is, accompanying the update of the limited number, the state of the traveling vehicles 3 is also updated.

Hereinafter, the update will be described by taking an example.

It is assumed that the following four records are stored in the traveling vehicle table D00 before the update.

(b1) Traveling vehicle ID=#0001, state=standby state C2, approach direction=A, leaving direction=D, current position=0 mm (b2) Traveling vehicle ID=#0002, state=normal traveling state C1, approach direction=A, leaving direction=C, current position=−1000 mm (b3) Traveling vehicle ID=#0003, state=standby state C2, approach direction=B, leaving direction=C, current position=0 mm (b4) Traveling vehicle ID=#0004, state=standby state C2, approach direction=B, leaving direction=D, current position=−1000 mm The limited numbers before the update are assumed to be $N_A$=1 and $N_B$=2. Assume that the limited numbers are updated to $N_A$=2 and $N_B$=1 in step S41. In step S42, the states of records in the traveling vehicle table D00 are updated such that the state is changed from the standby state C2 to the normal traveling state C1 in descending order of current position. That is, the above four records are updated as shown below:

(c1) Traveling vehicle ID=#0001, state=standby state C2, . . .

(c2) Traveling vehicle ID=#0002, state=standby state C2, . . .

(c3) Traveling vehicle ID=#0003, state=standby state C2, . . .

(c4) Traveling vehicle ID=#0004, state=normal traveling state C1,

Lastly, the limited number of vehicles update unit P4 updates the number of vehicles table D01 based on the traveling vehicle table D00 (step S43). Accompanying the change of the state by the processing in S42, the number of traveling vehicles is recompiled.

According to the third embodiment, as described above, by providing the limited number of vehicles update unit P4, more efficient traveling of the traveling vehicles 3 at a junction is enabled by dynamically changing the limited number of vehicles permitted to pass through a limited section 41 at a time in consideration of the degree of delay obtained from the degree of delay table D06 and the degree of delay weight table D07.

(Fourth Embodiment)

Hereinafter, the fourth embodiment of an automatic traveling vehicle system will be described.

The fourth embodiment is an embodiment that enables more efficient traveling by, in addition to the second embodiment, partially interchanging roles of traveling vehicles on standby to change to an arrangement that minimizes the transit time. The second embodiment and the fourth embodiment are almost the same excluding a partially different portion and thus, only portions that are different from the second embodiment will be described below.

Figure 24:
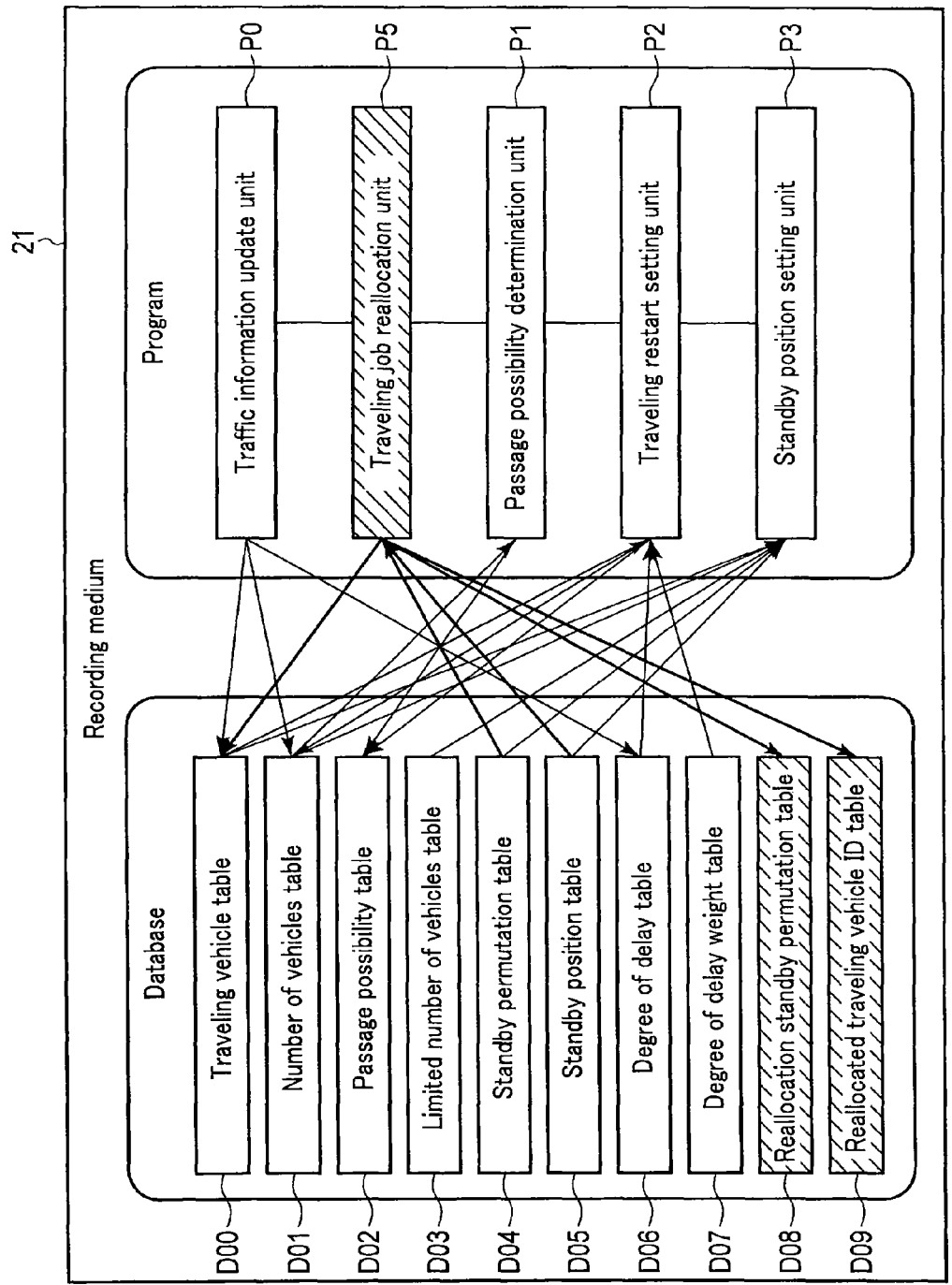
FIG. 24 is a block diagram showing a concrete configuration of a limited section controller in a fourth embodiment.

FIG. 24 is a block diagram showing the configuration of a computer program and a database of a limited section controller 2 in the fourth embodiment. What is different from the second embodiment is that a reallocation standby permutation table D08 and a reallocated traveling vehicle ID table D09 are added to the database and a traveling job reallocation unit P5 is added to the computer program (highlighted portions in FIG. 24).

Figures 25, 26:
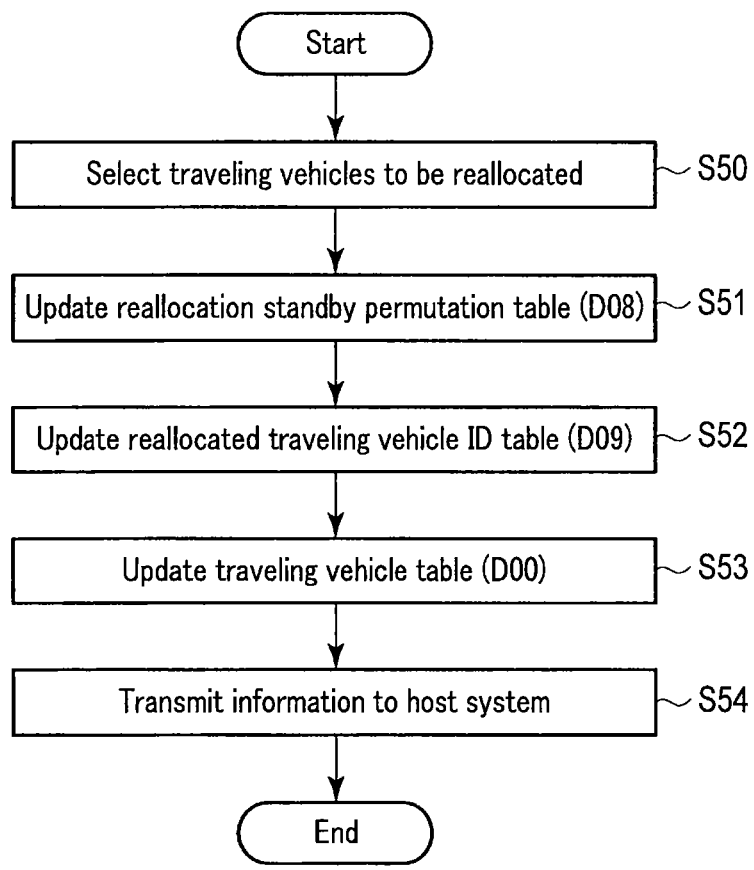
FIG. 25 is a flow chart of traveling job reallocation in the fourth embodiment.
FIG. 26 is a diagram showing an example of a reallocation standby permutation table in the fourth embodiment.

FIG. 25 is a flow chart showing processing by the traveling job reallocation unit P5.

The traveling job reallocation unit P5 selects reallocation target vehicles from traveling vehicles 3 in a standby state C2 (step S50). That is, among records of the traveling vehicles 3 in the state=standby state C2 stored in the traveling vehicle table D00, records whose traveling job ID can be interchanged (at the same time, the destination ID, route ID, and leaving direction are interchanged) are extracted.

An example of an automatic transportation vehicle of a factory is taken here to describe "traveling job IDs can be interchanged". As the traveling purpose of the traveling vehicle 3 to which the traveling job ID is tied in the case of, for example, an automatic transportation vehicle of a factory, (A) traveling to receive half-finished products before processing from a storage rack, (B) transporting half-finished products before processing to equipment planned for processing, (C) traveling to receive half-finished products after processing, (D) transporting half-finished products after processing to the storage rack, and (E) patrolling without any purpose can be cited. Of (A) to (E), the traveling vehicle travels without being loaded with lots in cases other than (B) and (D) and no problem is considered to be caused even if traveling jobs are interchanged while traveling. In step S50, as shown in the above example, whether traveling purposes to which traveling job IDs are tied can be interchanged is determined and interchangeable records are extracted as reallocation targets.

Hereinafter, the extraction of reallocation target vehicles will be described by taking an example. It is assumed that there are four records stored in the traveling vehicle table D00 and having the state=standby state C2.

(d1) Traveling vehicle ID=#0001, traveling job ID=C001, approach direction=A, leaving direction=D, destination ID=#01, route ID=R0101, current position=0 mm (d2) Traveling vehicle ID=#0002, traveling job ID=C002, approach direction=A, leaving direction=C, destination ID=#02, route ID=R0202, current position=−1000 mm (d3) Traveling vehicle ID=#0003, traveling job ID=C013, approach direction=B, leaving direction=C, destination ID=#03, route ID=R0303, current position=0 mm (d4) Traveling vehicle ID=#0004, traveling job ID=C004, approach direction=B, leaving direction=D, destination ID=#04, route ID=R0404, current position=−1500 mm Of the above traveling job IDs, C001, 0002, and C004 are considered to be interchangeable and C013 is considered to be not interchangeable. In this example, the traveling vehicles 3 of the traveling vehicle ID=#0001, #0002, #0004 are selected as reallocation target vehicles.

Next, the traveling job reallocation unit P5 generates a standby permutation from the set of reallocation target vehicles and updates the reallocation standby permutation table D08 (step S51). FIG. 26 shows an example of the reallocation standby permutation table D08. The reallocation standby permutation table D08 includes information of a standby permutation ID1, a standby permutation ID2, and the transit time. The standby permutation ID1 is a standby permutation in the approach direction A, the standby permutation ID2 is a standby permutation in the approach direction B, and each represents all combinations of the standby permutation obtained by interchanging reallocation target vehicles selected in step S50.

To describe by taking the above example, "a standby permutation 1" (approach direction A) and "a standby permutation 2" (approach direction B) before the interchange are as shown below:

(e1) "Standby permutation 1": (D, C), "standby permutation 2": (C, D)

In addition, if records of the traveling job IDs=C001, C002, C004 are interchanged, the following two combinations of the standby permutations are obtained:

(e2) "Standby permutation 1": (C, D), "standby permutation 2": (C, D)

(e3) "Standby permutation 1": (D, D), "standby permutation 2": (C, C)

The relevant standby permutation ID and the tied transit time of the above three combinations of standby permutations are stored in the standby position table D05 and the value obtained by adding the transit times of "the standby permutation 1" and "the standby permutation 2" is stored in the transit time of the reallocation standby permutation table D08 together with the relevant combinations of standby permutation IDs.

Next, the traveling job reallocation unit P5 searches for and acquires the combination of standby permutation IDs whose transit time is the shortest based on the reallocation standby permutation table D08 and updates the reallocated traveling vehicle ID table D09 according to the acquired combination (step S52).

FIG. 27 shows an example of the reallocated traveling vehicle ID table D09. The reallocated traveling vehicle ID table D09 includes information of the traveling vehicle ID before reallocation and traveling vehicle ID after reallocation. First, the traveling job reallocation unit P5 selects the record whose transit time is the shortest from the reallocation standby permutation table D08. To describe by taking the above example, it is assumed that, for example, among the three combinations, the transit time of the following is the shortest.

"Standby permutation 1": (D, D), "standby permutation 2": (C, C)

Comparison of this combination with the combination before the interchange shows that the traveling vehicle IDs=#0002, #0004 may be interchanged. In this example, two records of the traveling vehicle ID before reallocation=#0002 and the traveling vehicle ID after reallocation=#0004, and the traveling vehicle ID before reallocation=#0004 and the traveling vehicle ID after reallocation=#0002 are stored in the reallocated traveling vehicle ID table D09.

Next, the traveling job reallocation unit P5 updates the traveling vehicle table D00 based on the reallocated traveling vehicle ID table D09 (step S53). In the traveling vehicle table D00, information of the traveling job ID, leaving direction, destination ID, and route ID of a record matching the traveling vehicle ID=traveling vehicle ID before reallocation with corresponding values of a record matching the traveling vehicle ID=traveling vehicle ID after reallocation. In the above example, two records of the traveling vehicle IDs=#0002, #0004 are changed as shown below:

(f1) Traveling vehicle ID=#0002, traveling job ID=C004, approach direction=A, leaving direction=D, destination ID=#04, route ID=R0404, current position=−1000 mm (f2) Traveling vehicle ID=#0004, traveling job ID=C002, approach direction=B, leaving direction=C, destination ID=#02, route ID=R0202, current position=−1500 mm Lastly, the traveling job reallocation unit P5 transmits the reallocated information to a host system 1 via LAN (U) (step S54). That is, the traveling job reallocation unit P5 transmits information of the traveling job ID, destination ID, and route ID tied to the traveling vehicle ID reallocated in step S53 to the host system 1 to update information stored in a recording medium 11 of the host system 1.

According to the fourth embodiment, as described above, more efficient traveling at a junction is enabled by partially interchanging roles of traveling vehicles on standby by referring to the reallocation standby permutation table D08 and the reallocated traveling vehicle ID table D09 by the traveling job reallocation unit P5 to change to an arrangement that minimizes the transit time.

(Other Embodiments)

While certain embodiments of the invention have been described, these embodiments have been presented by way of example only, and are not intended to limit the scope of the inventions. Indeed, the novel methods and systems described herein may be embodied in a variety of other forms; furthermore, various omission, substitutions and changes in the form of the methods and systems described herein may be without departing from the spirit of the inventions. The accompanying claims and their equivalents are intended to cover such forms or modifications as would fall within the scope and spirit of the inventions.

The invention claimed is:

1. An automatic traveling vehicle system comprising:
   a plurality of traveling vehicles each having a controller which automatically controls traveling of a respective one of the traveling vehicles based on respective traveling information, the traveling information indicating at least a distance between a current position and a forward vehicle;
   a traveling path including a junction provided with a limited section to avoid a collision between traveling vehicles; and
   a limited section controller which exercises control to determine whether to permit at least one of the traveling vehicles to pass by monitoring delay conditions of the at least one of the traveling vehicles at least near the junction in the limited section, wherein
   the limited section controller comprises
   a traffic information update unit configured to update delay information of the at least one of the traveling vehicles near the junction,
   a determination unit configured to determine whether to permit the at least one of the traveling vehicles to pass based on whether there is another traveling vehicle in the limited section obtained from the updated delay information, a standby position setting unit configured to set a standby position of each of a limited number or less of traveling vehicles present in a standby section before the limited section, when the limited section is not passable, a traveling restart setting unit configured to determine an approach direction into the limited section for which traveling is restarted and causes a traveling vehicle on standby in the standby section in the approach direction to restart to travel, when the limited section is passable, and a reallocation unit configured to partially interchange at least one of a destination, a route and a leaving direction of traveling vehicles on standby such that a time needed to finish passing through the limited section is minimized, using stored information of each of the traveling vehicles including the destination, the route, and the leaving direction of the limited section.

2. The automatic traveling vehicle system of claim 1, wherein the standby position setting unit calculates the standby position of each of the limited number or less of traveling vehicles present in the standby section and transmits information to the limited number or less of traveling vehicles.

3. The automatic traveling vehicle system of claim 1, wherein the traveling restart setting unit determines the approach direction in which traveling should be restarted next based on an approach direction passable in a past and the delay conditions of at least one of the traveling vehicles traveling in a respective one of a plurality of approach directions.

4. The automatic traveling vehicle system of claim 1, wherein the limited section controller comprises a limited number of vehicles update unit configured to update a limited number for the limited number or less of the traveling vehicles based on the delay conditions of traveling vehicles in the approach direction.

5. A control method of an automatic traveling vehicle system comprising a limited section controller which exercises control to determine whether to permit a traveling vehicle to pass by monitoring delay conditions of a plurality of traveling vehicles at least near a junction in a limited section to avoid a collision between traveling vehicles, the method comprising using the limited section controller to:

update delay information of at least one of the traveling vehicles near the junction, determine whether to permit the at least one of the traveling vehicles to pass based on whether there is another traveling vehicle in the limited section obtained from the updated delay information, set a standby position of each of a limited number or less of traveling vehicles of the traveling vehicles present in a standby section before the limited section, when the limited section is not passable, determine an approach direction into the limited section for which traveling is restarted and instruct at least one of the traveling vehicles on standby in the standby section in the approach direction to restart to travel, when the limited section is passable, and partially interchange at least one of a destination, a route, and a leaving direction of traveling vehicles on standby such that a time needed to finish passing through the limited section is minimized, using stored information on the traveling vehicles including the destination, the route, and the leaving direction of the limited section.

6. A non-transitory computer readable medium having stored thereon a computer program which is executed by a limited section controller, wherein the limited section controller exercises control to determine whether to permit a traveling vehicle to pass by monitoring delay conditions of a plurality of traveling vehicles, at least one of which is near a junction in a limited section, to avoid a collision between traveling vehicles, the computer program controlling the limited section controller to execute functions of:

updating delay information of a traveling vehicle near a junction, determining whether to permit at least one of the traveling vehicles to pass based on whether there is another traveling vehicle in the limited section obtained from the updated delay information, setting a standby position of each of a limited number or less of traveling vehicles of the traveling vehicles present in a standby section before the limited section, when the limited section is not passable, determining an approach direction into the limited section for which traveling is restarted and instructing a traveling vehicle on standby in the standby section in the approach direction to restart to travel, when the limited section is passable, and partially interchanging at least one of a destination, a route, and a leaving direction of traveling vehicles on standby such that a time needed to finish passing through the limited section is minimized, using stored information of the traveling vehicles including the route, and the leaving direction of the limited section.

\* \* \* \* \*